United States Patent [19]

Hosoe

[11] Patent Number: 4,822,101
[45] Date of Patent: Apr. 18, 1989

[54] WALK-IN MECHANISM IN SEAT ASSEMBLY

[75] Inventor: Takashi Hosoe, Kanagawa, Japan

[73] Assignee: Ikeda Bussan Co., Ltd., Ayase, Japan

[21] Appl. No.: 205,939

[22] Filed: Jun. 13, 1988

[30] Foreign Application Priority Data

Sep. 30, 1987 [JP] Japan .......................... 62-150122[U]

[51] Int. Cl.$^4$ .............................................. B60N 1/04
[52] U.S. Cl. .................................... 297/379; 297/341
[58] Field of Search .............. 297/340, 341, 342, 378, 297/379; 74/519, 522; 296/65 R; 248/429, 430

[56] References Cited

U.S. PATENT DOCUMENTS

| | | | |
|---|---|---|---|
| 3,931,995 | 1/1976 | Arai | 297/341 |
| 3,940,182 | 2/1976 | Tamura | 297/379 X |
| 4,015,877 | 4/1977 | Button | 297/341 |
| 4,497,518 | 2/1985 | Nishimura et al. | 297/341 |
| 4,607,884 | 8/1986 | Heling | 297/379 X |
| 4,634,180 | 1/1987 | Zaveri et al. | 297/341 |

*Primary Examiner*—Peter R. Brown
*Attorney, Agent, or Firm*—Foley & Lardner, Schwartz, Jeffery, Schwaab, Mack, Blumenthal & Evans

[57] ABSTRACT

A walk-in mechanism for an automotive seat is disclosed which comprises a base plate having first and second portions which are pivotally connected to a seatback and a seat cushion respectively through a first pivot shaft of a reclining device and a second pivot shaft, so that the base plate is pivotal about the second pivot shaft together with the seatback; a latch for latching the base plate to the seat cushion; a first link member secured to the seatback to move therewith; a second link member pivotally connected to the base plate, the second link member having axially opposed first and second end portions, the first end portion being connected to the first link member through a first lost-motion device; a third link member pivotally connected to the base plate, the third link member having first and second wing portions, the first wing portion being connected to the second end portion of the second link member through a second lost-motion device; and a transmission wire having one end fixed to the latch pawl member and the other end which is connected to the second wing portion of the second link member through a third lost-motion device.

9 Claims, 3 Drawing Sheets

WALK-IN MECHANISM IN SEAT ASSEMBLY

BACKGROUND OF THE INVENTION

1. Field of the Invention

The present invention relates in general to an automotive seat and more particularly to a seat assembly having a seat slide device for sliding the seat to a desired position and latching the same at the desired position. More specifically, the present invention is concerned with a so-called "walk-in" mechanism incorporated with the seat slide devices, by which egress and ingress of a rear seat passenger is facilitated.

2. Description of the Prior Art

Hitherto, various types of seat slide devices have been proposed and put into practical use particularly in the field of motor vehicles. Some are of a type which is equipped with a so-called "walk-in" mechanism which, for facilitation of egress and ingress of a rear seat passenger, permits a forward movement of the seat when the seatback of the seat is inclined forward.

In order to clarify the task of the present invention, one of the conventional seat slide devices of the above-mentioned walk-in type will be described with reference to FIGS. 4, 5 and 6 of the accompanying drawings.

Referring to the drawings, particularly FIG. 6, there is schematically shown a seat slide device 10 to which the conventional walk-in mechanism is practically applied. The seat slide device 10 comprises two parallel stationary rails 12 (only one is shown) secured to a vehicle floor (not shown), two movable rails 11 (only one is shown) slidably disposed on the stationary rails 12 and mounting thereon a seat "S" (see FIG. 4), and roller and ball bearings 13a and 13b arranged between the coupled rails 12 and 11 to smooth the movement of the movable rails 11 relative to the stationary rails 12. One of the stationary rails 12 has an axially extending latch plate 14 secured thereto. The latch plate 14 is formed with a plurality of aligned notches 14a. Latchingly engageable with the notches 14a is a latch pawl member 20 which is pivotally connected to the movable rail 11 through a pivot shaft 20a. Although not shown in the drawing, a coil spring is disposed about the pivot shaft 20a to bias the same in a direction to bring the latch pawl member 20 into latching engagement with the notches 14a. Thus, when the latch pawl member 20 is pulled against the biasing force of the spring to assume its inoperative position (viz., the position "B" or "C"), the sliding movement of the movable rail 11 relative to the stationary rail 12 is permitted. While, when the latch pawl member 20 is engaged with selected one of the notches 14a, the movable rail 11 is latched to the stationary rail 12. Thus, under this condition, the seat on the movable rail 11 can not move any longer, that is, the seat is latched at a desired position relative to the vehicle floor.

The conventional walk-in mechanism is incorporated with the latch pawl member 20 in such a manner as will be described in the following.

As is seen FIGS. 4 and 5, the walk-in mechanism comprises a pivot shaft 6 through which a link member 4 is pivotally connected to a seat cushion 1 of the seat "S". The link member 4 is connected to a seatback 2 through a known reclining mechanism 5. Denoted by numeral 3 is a bracket through which a pivot shaft of the reclining mechanism 5 is connected to the seatback 2. The inclination angle of the seatback 2 relative to the seat cushion 1 is thus adjustable by pivoting the seatback 2 about the pivot shaft of the reclining mechanism 5. That is, the seatback 2 and the link member 4 can be locked with each other with a desired relative angle defined therebetween. As is shown in FIG. 5, the walk-in mechanism further comprises a holding pin 16 secured to the seat cushion 1 and a hook member 15 pivotally connected to the link member 4. Although not shown in the drawing, a control wire extends from the hook member 15 to a control lever which is mounted to the seatback 2. Thus, when, due to manipulation of the control lever, the hook member 15 is disengaged from the holding pin 16, the seatback 2 can pivot about the pivot shaft 6 forward together with the link member 4 keeping the desired relative angle between the seatback 2 and the link member 4. The link member 4 has a downward projection 4a to which a flexible transmission wire 7 is connected through a connecting pin 8. The wire 7 is slidably received in an elongate and bent tube 7a secured to a bottom portion of the seat cushion 1 and extends to the afore-mentioned latch pawl member 20 (see FIG. 6). Thus, when, with the hook member 15 kept disengaged from the holding pin 16, the seatback 2 is inclined forward about the pivot shaft 6 to its forward angular position as illustrated by the dot-dot-dash line in FIG. 4, the wire 7 is pulled toward the link member 4 thereby pivoting the latch pawl member 20 in the direction to disengage from the notches 14a of the plate 14. Upon this, the movable rail 11 (and thus the seat "S" mounted thereon) is moved forward to its foremost position by an action of a pull spring (not shown) which is arranged in the seat slide device in a known manner. Under this condition, egress and ingress of a rear seat passenger is easily made.

However, due to its inherency in construction, the above-mentioned seat slide device has the following drawbacks.

That is, the moved distance of the wire 7 changes largely depending on the position which the seatback 2 has assumed before execution of the walk-in operation. This will be well understood from FIG. 4 wherein two selected positions "I" and "II" of the seatback 2, which have been set by the reclining mechanism 5, are illustrated by the solid and dot-dash lines respectively. In order to achieve the walk-in operation with the seatback 2 assuming the position "I", the seatback 2 must incline forward by an angle "x", while when assuming the position "II", the seatback 2 must incline by a larger angle "y". As will be seen from FIG. 5, the angular difference (viz., y-x) thus produced brings about a difference in moved distance of the wire 7 which is directly connected to the link member 4.

However, as is seen from FIG. 6, the difference in moved distance of the wire 7 makes the determination of the effective length of the wire 7 difficult or at least troublesome. That is, when the wire 7 is set longer than a desired length, it tends to occur that the latch pawl member 20 fails to disengage from the notches 14a even when the seatback 2 is inclined to its foremost angular position, while, when the wire 7 is set shorter than the desired length, it tends to occur that, as is indicated by the arrow "C", the latch pawl member 20 is pulled excessively when the seatback 2 is inclined forward. Of course, these phenomena are disadvantageous in achieving a proper and smooth operation of the walk-in mechanism.

SUMMARY OF THE INVENTION

It is therefore an object of the present invention to provide an improved walk-in mechanism incorporated with a seat slide device, which is free of the drawbacks encountered in the above-mentioned conventional seat slide device.

According to the present invention, there is provided a walk-in mechanism in a seat assembly which includes a seat cushion, a seatback pivotally connected to the seat cushion, a stationary rail stationarily mounted on a floor, a movable rail slidably disposed on the stationary rail and mounting thereon the seat cushion, a fore-and-aft position lock mechanism having a pivotal latch pawl member which locks the movable rail to the stationary rail when pivoted in a first direction and releases the movable rail from the stationary rail when pivoted in a second direction, and a reclining mechanism including a first pivot shaft about which the seatback is pivotal to determine an angular position of the seatback relative to the seat cushion and means for locking the seatback at the angular position. The walk-in mechanism comprises a base plate having first and second portions which are pivotally connected to the seatback and the seat cushion respectively through the first pivot shaft and a second pivot shaft, so that the base plate is pivotal about the second pivot shaft together with the seatback; a latch means for latching the base plate to the seat cushion; a first link member secured to the seatback to move therewith; a second link member pivotally connected to the base plate, the second link member having axially opposed first and second end portions, the first end portion being connected to the first link member through a first lost-motion device; a third link member pivotally connected to the base plate, the third link member having first and second wing portions, the first wing portion being connected to the second end portion of the second link member through a second lost-motion device; and a transmission wire having one end fixed to the latch pawl member and the other end which is connected to the second wing portion of the second link member through a third lost-motion device.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, an embodiment of the present invention will be described with reference to the accompanying drawings. Throughout the specification and drawings, similar parts and constructions to those of the afore-mentioned conventional device are denoted by the same numerals. Furthermore, the terms "upward", "downward", "rightward", "leftward" and the like are to be understood with reference to the drawings on which the corresponding parts and constructions are illustrated.

Figure 1:
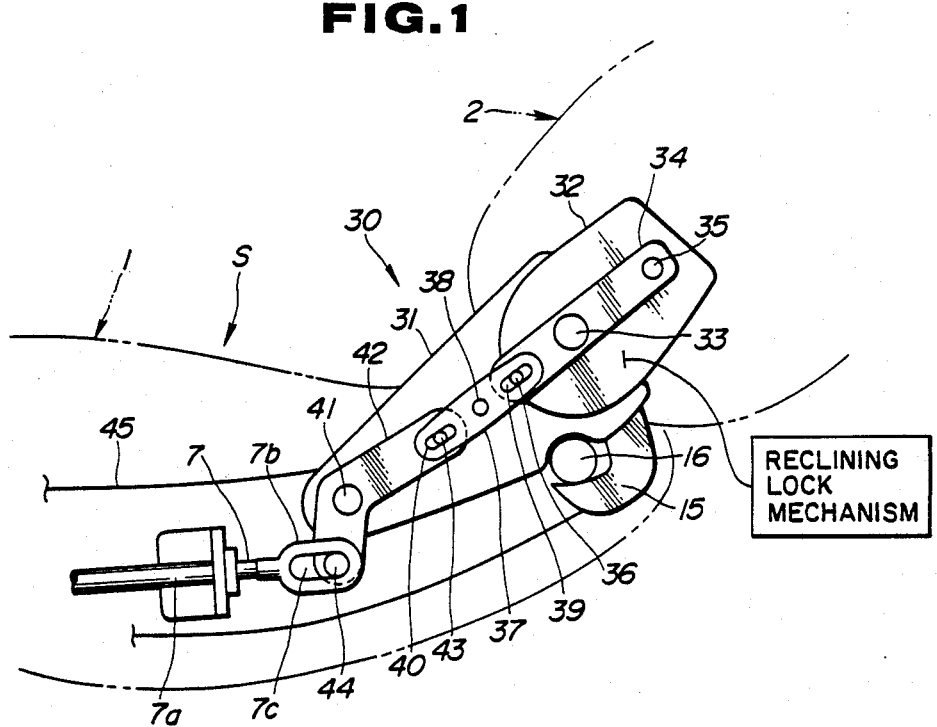
FIG. 1 is a front but partial view of an essential part of a walk-in mechanism according to the present invention.
Figure 2:
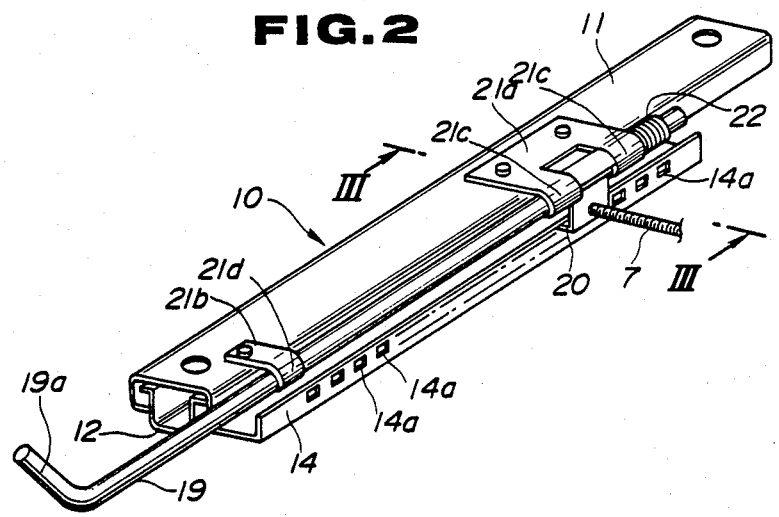
FIG. 2 is a perspective view of a seat slide device to which the walk-in mechanism of the present invention is practically applied.
Figure 3:
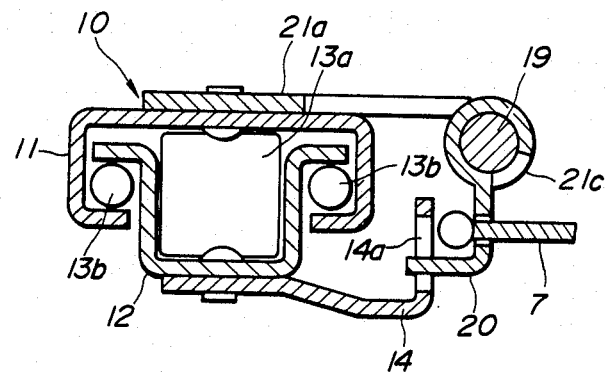
FIG. 3 is an enlarged sectional view taken along the line III—III of FIG. 2.

Referring to FIGS. 1 to 3, particularly FIGS. 2 and 3, there is shown a seat slide device 10 to which an improved walk-in mechanism 30 of the present invention is practically applied. The seat slide device 10 comprises two parallel stationary rails 12 (only one is shown) secured to a vehicle floor (not shown), two movable rails 11 (only one is shown) slidably disposed on the stationary rails 12 and mounting thereon a seat "S" (see FIG. 1), and roller and ball bearintgs 13a and 13b arranged between the coupled rails 12 and 11 to smooth the movement of the movable rails 11 relative to the stationary rails 12. One of the stationary rails 12 has an axially extending plate 14 secured thereto. The plate 14 is formed with a plurality of aligned openings 14a. Latchingly engageable with the openings 14a is a latch pawl member 20 which is secured to a control shaft 19 to move therewith. The control shaft 19 extends along the movable rail 11 and is connected to the same through first and second brackets 21a and 21b in a manner to be rotatable about the axis thereof. For rotatably supporting the control shaft 19, the bracket 21a is formed with axially spaced curled portions 21c, and the other bracket 21b is formed with a curled portion 21d. A front end portion of the control shaft 19 is bent at generally right angles to provide a handle 19a. A coil spring 22 is disposed about the control shaft 19 to bias the same in a direction to bring the latch pawl member 20 into latching engagement with the openings 14a of the plate 14. Thus, when, due to manipulation of the handle 19a, the latch pawl member 20 is disengaged from the openings 14a of the plate 14, the sliding movement of the movable rail 11 is permitted. While, when the latch pawl member 20 is engaged with selected one of the openings 14a, the movable rail 11 is latched to the stationary rail 12 and thus the seat "S" is locked to the stationary rail 12.

The improved walk-in mechanism of the present invention is incorporated with the above-mentioned seat slide device 10 in such a manner as will be described in the following.

As is seen from FIG. 1, the walk-in mechanism 30 comprises a first holding plate 45 secured to a side portion of a seat cushion 1, a second holding plate 32 secured to a side portion of a seatback 2 and a base plate 31 arranged between the first and second holding plates 45 and 32. A first link member 34 is secured to the second holding plate 32. Preferably, the first link member 34 is integral with the second holding plate 32. A second link member 37 is pivotally connected at its middle portion to a generally middle portion of the base plate 31, and a generally L-shaped third link member 42 is pivotally connected through a pivot shaft 41 to a lower end portion of the base plate 31. The pivot shaft 41 extends laterally through the seat cushion 1. It is thus to be noted that the base plate 31 is pivotal about the pivot shaft 41.

The base plate 31 is connected to the seatback 2 through a known reclining mechanism which has a pivot shaft 33. Thus, the inclination angle of the seatback 2 relative to the seat cushion 1 is thus adjustable by pivoting the seatback 2 about the pivot shaft 33 of the reclining mechanism. That is, the seatback 2 and the base plate 31 can be locked with each other with a desired relative angle defined therebetween. As is shown in the drawing, the walk-in mechanism 30 further comprises a holding pin 16 secured to the first holding plate 45 and a hook member 15 pivotally connected to the base plate 31. Although not shown, a control wire extends from the pivotal hook member 15 to a control lever which is mounted to the seatback 2. Thus, when, due to manipulation of the control lever, the hook member 15 is disengaged from the holding pin 16, the seatback 2 can pivot about the pivot shaft 41 forward together with the base plate 31 keeping the desired relative angle between the seatback 2 and the base plate 31.

The second link member 37 has axially opposed end portions which are respectively formed with first and second slots 39 and 40. Slidably engaged with the first slot 39 is a first pin 36 which is connected to the first link member 34. Slidably engaged with the second slot 40 is a second pin 43 which is connected to one arm portion of the third link member 42.

The third link member 42 is provided at the other arm portion with a connecting pin 44. Slidably engaged with the connecting pin 44 is a slot 7c of a wire connector 7b. The connector 7b is fixed to an end of a flexible transmission wire 7 which extends through an elongate tube 7a to the afore-mentioned latch pawl member 20 (see FIG. 2). The elongate tube 7a is connected to the first holding plate 45 through brackets (no numerals).

In the following, operation will be described.

For ease of understanding, the description will be commenced with respect to an in-use condition of the seat "S" wherein the seat is locked to the stationary rail 12 with the seatback 2 assuming a desired inclined position. Under this condition, the latch pawl member 20 is latchingly engaged with one of the openings 14a of the latch plate 14, and the seatback 2 is locked to the seat cushion 1 with a desired relative angle defined therebetween.

When, for changing the angle of the seatback 2 relative to the seat cushion 1, a control lever (not shown) is manipulated, the locked condition of the seatback 2 to the seat cushion 1 is cancelled and thus thereafter the seatback 2 can pivot freely about the pivot shaft 33 of the reclining mechanism. When the seatback 2 is pivoted to a desired new position, the control lever is released. Upon this, the reclining mechanism locks the seatback 2 at the new position. During this operation, the hook member 15 of the walk-in mechanism is kept engaged with the holding pin 16. During the pivotal movement of the seatback 2, the first link member 34 moves in the same manner and thus the first pin 36 of the first link member 34 pivots the second and third link members 37 and 42 in opposite directions about the pivot pin 38 and the pivot shaft 41 respectively. However, this pivotal movement does not induce movement of the transmission wire 7 due to a so-called "lost-motion" connection between the third link member 42 and the connector 7b. This will be well understood from the following description.

That is, when the seatback 2 is inclined backward, that is, in a clockwise direction in FIG. 1 from the illustrated position, the second link member 37 turns in a counterclockwise direction and the third link member 42 turns in a clockwise direction. Thus, during this, the connecting pin 44 of the third link member 42 moves leftward in the slot 7c of the connector 7b. While, when the seatback 2 is then inclined forward toward the illustrated position, the second link member 37 turns in a clockwise direction and the third link member 42 turns in a counterclockwise direction. Thus, the connecting pin 44 moves rightward in the slot 7c, and comes into contact with the right end of the slot 7c, as shown in FIG. 1. The lost-motion connection between the third link member 42 and the connector 7b is so made as not to move the wire 7 so long as the pivotal movement of the seatback 2 is effected by the reclining mechanism.

The operation of the walk-in mechanism is as follows.

The control lever (not shown) for the hook member 15 is manipulated to disengage the hook member 15 from the holding pin 16. With this, the seatback 2 can pivot about the pivot shaft 41 forward together with the base member 31 keeping the relative angle defined between the seatback 2 and the base plate 31.

When the pivotal movement of the seatback 2 starts from a position wherein the reclining angle of the seatback 2 is relatively small and thus, as is shown in FIG. 1, the connecting pin 44 is placed near or contacts to the right end of the slot 7c of the wire connector 7b, the forward pivoting of the seatback 2 instantly brings about pulling of the wire 7. While, when the pivotal movement of the seatback 2 starts from a position wherein the reclining angle of the seatback 2 is relatively large and thus, the connecting pin 44 is placed near the left end of the slot 7c of the wire connector 7b, the pulling of the wire 7 is somewhat delayed as compared with the above-mentioned condition because of presence of a considerable space remained between the connecting pin 44 and the right end of the slot 7c.

When the wire 7 is thus pulled toward the third link member 42, the latch pawl member 20 to which the wire 7 is connected is pulled against the force of the coil spring 22 thereby cancelling the engagement with the selected one of the openings 14a. Upon this, the movable rail 11 (and thus the seat "S" mounted thereon) is moved forward to its foremost position by an action of a pull spring (not shown) which is arranged in the seat slide device in a known manner. Thus, there is produced a relatively large space behind the seat "S" thereby facilitating egress and ingress of a rear seat passenger.

When thereafter the seatback 2 is raised up, the third link member 42 is turned in a counterclockwise direction in FIG. 1 causing a movement of the transmission wire 7 toward the latch pawl member 20 due to the work of the coil spring 22. When the seatback 2 is raised up to a certain raised position, the latch pawl member 20 is brought into latching engagement with one of the openings 14a of the latch plate 14 and at the same time the hook member 15 is latched to the holding pin 16. Under this condition, the connecting pin 44 of the third link member 42 contacts the right end of the slot 7c of the wire connector 7b, as shown in FIG. 1.

Thereafter, for adjusting the fore-and-aft position of the seat "S", the handle 19a of the control shaft 19 is turned against the coil spring 22 to disengage the latch pawl member 20 from the opening 14a of the latch plate 14, and with the handle 19a kept manipulated, the seat "S" is pushed rearward to a desired position. When the seat "S" comes to the position, the handle 19a is released. With this, the latch pawl member 20 is brought into a new one of the openings 14a thereby locking the seat "S" at the desired new position. It is to be noted that because of the nature of the slot 7c of the wire connector 7b, the rightward movement of the wire 7 due to the disengaging pivoting of the latch pawl member 20 is not obstructed by the connecting pin 44.

In the following, advantages of the present invention will be described.

Figure 4:
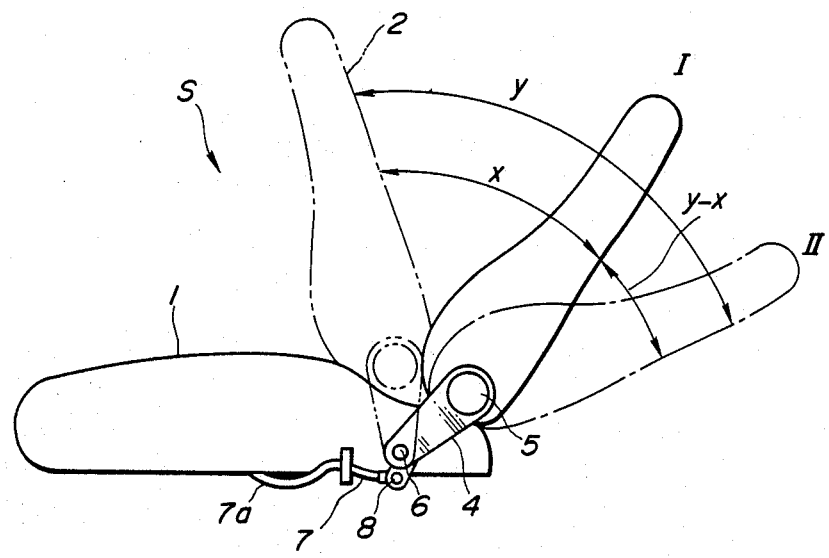
FIG. 4 is a schematic side view of a reclining seat to which a conventional walk-in mechanism is applied.
Figure 5:
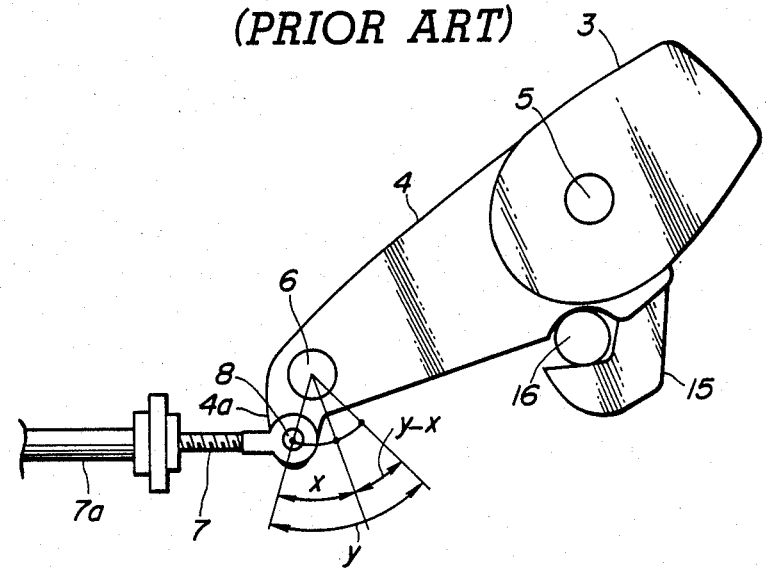
FIG. 5 is an illustration of an essential part of the conventional walk-in mechanism.
Figure 6:
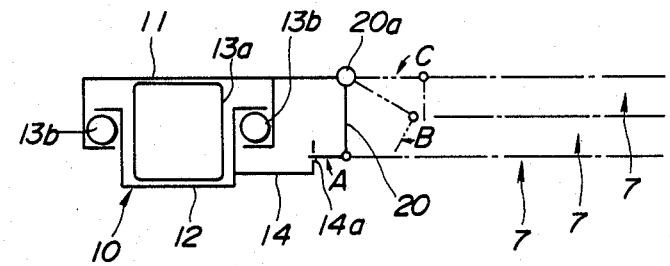
FIG. 6 is a schematic illustration of a seat slide device incorporated with the conventional walk-in mechanism, showing various operation modes of the walk-in mechanism.

Due to the nature of the lost-motion connection between the third link member 42 and the wire connector 7b, the moved distance of the wire 7 is substantially constant irrespective of the position which the seatback 2 has assumed before execution of the walk-in operation. Thus, unlike the case of the afore-mentioned conventional walk-in mechanism of FIGS. 4, 5 and 6, the determination of the effective length of the wire 7 is easily made. That is, in accordance with the present invention, the engagement and the disengagement between the latch pawl member 20 and the openings 14a of the latch plate 14 are assuredly and exactly carried out. The undesired excessive pulling of the latch pawl member 20 by the wire 7 is thus suppressed.

What is claimed is:

1. In a seat assembly including a seat cushion, a seatback pivotally connected to the seat cushion, a stationary rail stationarily mounted on a floor, a movable rail slidably disposed on said stationary rail and mounting thereon said seat cushion, a fore-and-aft position lock mechanism having a pivotal latch pawl member which locks said movable rail to said stationary rail when pivoted in a first direction and releases said movable rail from said stationary rail when pivoted in a second direction, and a reclining mechanism including a first pivot shaft about which said seatback is pivotal to determine an angular position of said seatback relative to said seat cushion and means for locking said seatback at said angular position, a walk-in mechanism comprising:
a base plate having first and second portions which are pivotally connected to said seatback and said seat cushion respectively through said first pivot shaft and a second pivot shaft, so that said base plate is pivotal about said second pivot shaft together with said seatback;
a latch means for latching said base plate to said seat cushion;
a first link member secured to said seatback to move therewith;
a second link member pivotally connected to said base plate, said second link member having axially opposed first and second end portions, said first end portion being connected to said first link member through a first lost-motion device;
a third link member pivotally connected to said base plate, said third link member having first and second wing portions, said first wing portion being connected to said second end portion of the second link member through a second lost-motion device; and
a transmission wire having one end fixed to said latch pawl member and the other end which is connected to the second wing portion of the third link member through a third lost-motion device.

2. A walk-in mechanism as claimed in claim 1, in which said each of said first, second and third lost-motion devices comprises a pin and means defining a slot in which said pin is slidably received.

3. A walk-in mechanism as claimed in claim 2, in which said pin of said first lost-motion device is secured to said first link member, and said slot of the first lost-motion device is formed in said first end portion of said second link member.

4. A walk-in mechanism as claimed in claim 3, in which the pin of said second lost-motion device is secured to said first wing portion of the third link member, and said slot of the second lost-motion device is formed in said second end portion of said second link member.

5. A walk-in mechanism as claimed in claim 4, in which the pin of said third lost-motion device is secured to said second wing portion of said third link member, and said slot of the third lost-motion device is formed in a wire connector to which the other end of said transmission wire is connected.

6. A walk-in mechanism as claimed in claim 5, in which said first link member is connected to said seatback through a holding plate to which said first pivot shaft of the reclining mechanism is journaled.

7. A walk-in mechanism as claimed in claim 6, in which said latch means comprises a holding pin secured to said seat cushion through a holding plate and a hook member pivotally connected to said base plate.

8. A walk-in mechanism as claimed in claim 7, in which said transmission wire is slidably received in a tube which is secured to said seat cushion through brackets.

9. A walk-in mechanism as claimed in claim 6, in which said first link member is integral with said holding plate.

* * * * *